(12) United States Patent
Heo et al.

(10) Patent No.: US 12,207,320 B2
(45) Date of Patent: Jan. 21, 2025

(54) TERMINAL AND SYSTEM FOR FACILITATING BLUETOOTH CONNECTIONS

(71) Applicant: LG ELECTRONICS INC., Seoul (KR)

(72) Inventors: Kwangwoo Heo, Seoul (KR); Dahee Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 17/890,658

(22) Filed: Aug. 18, 2022

(65) Prior Publication Data
US 2023/0389089 A1    Nov. 30, 2023

(30) Foreign Application Priority Data

May 30, 2022  (KR) .......................... 10-2022-0066067

(51) Int. Cl.
*H04W 76/10*  (2018.01)
*G08C 17/02*  (2006.01)
*H04W 4/80*  (2018.01)

(52) U.S. Cl.
CPC ............ *H04W 76/10* (2018.02); *G08C 17/02* (2013.01); *H04W 4/80* (2018.02)

(58) Field of Classification Search
CPC ........ H04W 4/80; H04W 76/10; H04W 12/47
See application file for complete search history.

(56) References Cited

U.S. PATENT DOCUMENTS

| 2004/0042413 | A1  | 3/2004 | Kawamura et al. |
| 2011/0070827 | A1* | 3/2011 | Griffin ..................... H04B 5/48  455/41.1 |
| 2012/0135686 | A1* | 5/2012 | Yang ................... H04M 1/6066  455/41.2 |

OTHER PUBLICATIONS

European Patent Office Application Serial No. 22187373.0, Search Report dated Jan. 5, 2023, 6 pages.

* cited by examiner

*Primary Examiner* — Tuan H Nguyen
(74) *Attorney, Agent, or Firm* — LEE, HONG, DEGERMAN, KANG & WAIMEY

(57) ABSTRACT

According to an embodiment of the present disclosure, a terminal may include a display; a Near Field Communication (NFC) circuit configured to perform NFC communication with a remote control device of a display device; a Bluetooth circuit; and a processor configured to transmit, to the remote control device, an NFC tagging signal, and transmit, to the display device, a request for the display device to establish Bluetooth connection with a selected external device that is Bluetooth-connected to the terminal in response to the NFC tagging signal.

19 Claims, 18 Drawing Sheets

FIG. 6B
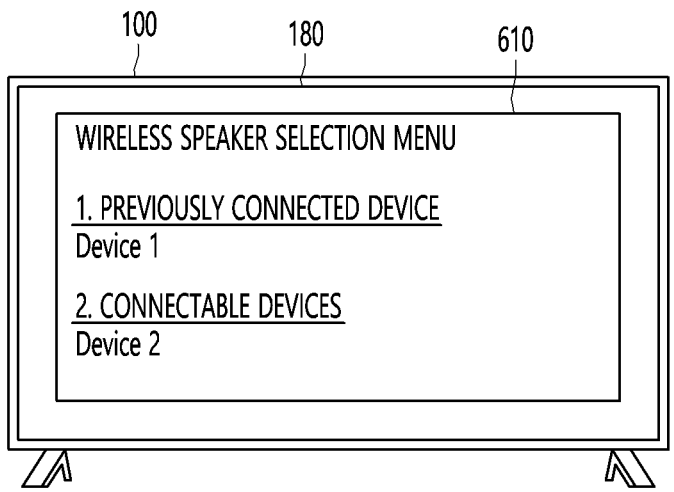
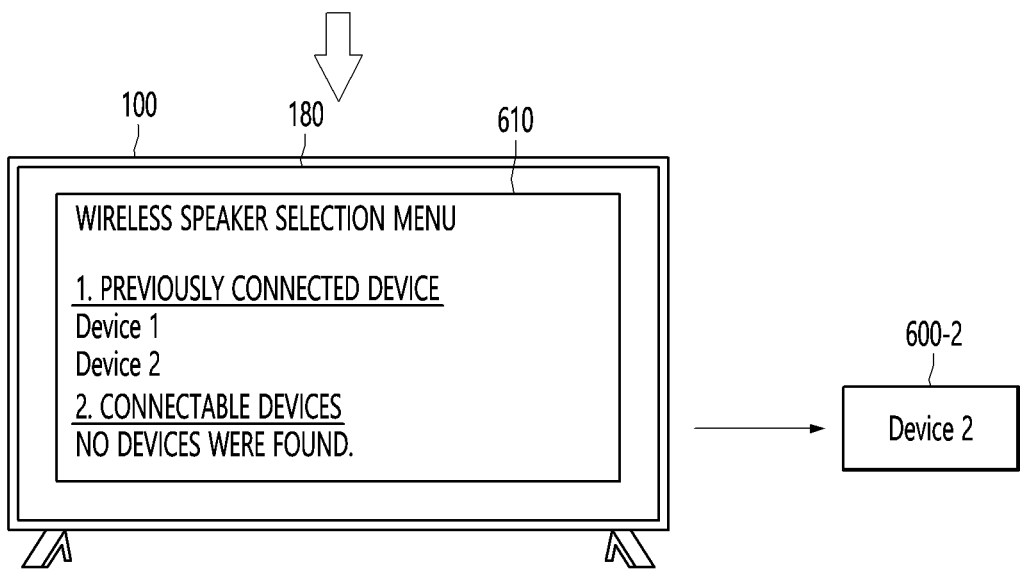

ACTION FOUND Device name : [LG] webos ART10AKPLfffff hardwareAddr :

ACTION FOUND Device name : , ,o22.kr hardwareAddr : 24:E8:53:B7:B4:41
ACTION FOUND Device name : [LG] webOS TV WEBOS6.0 hardwareAddr :

ACTION FOUND Device name : null hardwareAddr : 61:1F:87:7B:53:5B
ACTION FOUND Device name : null hardwareAddr : 76:89:59:29:3D:8C
ACTION FOUND Device name : null hardwareAddr : 67:CB:BB:A9:FC:4D
ACTION FOUND Device name : [LG] webOS TV WEBOS22 hardwareAddr :      ── 621

ACTION FOUND Device name : [LG] webos ART10AKPLfffff hardwareAddr :

ACTION FOUND Device name : [LG] webOS TV WEBOS22 hardwareAddr :      ── 623

ACTION FOUND Device name : [LG] webOS TV WEBOS6.0 hardwareAddr :

ACTION FOUND Device name : , ,o22.kr hardwareAddr : 24:E8:53:B7:B4:41
ACTION FOUND Device name : [LG] webOS TV KEY0000103F hardwareAddr :

ACTION FOUND Device name : [LG] webOS TV WEBOS22k8hp hardwareAddr :

ACTION FOUND Device name : , ,o22.kr hardwareAddr : 24:E8:53:B7:B4:41
ACTION FOUND Device name : [LG] webOS TV WEBOS22 hardwareAddr :      ── 625
```

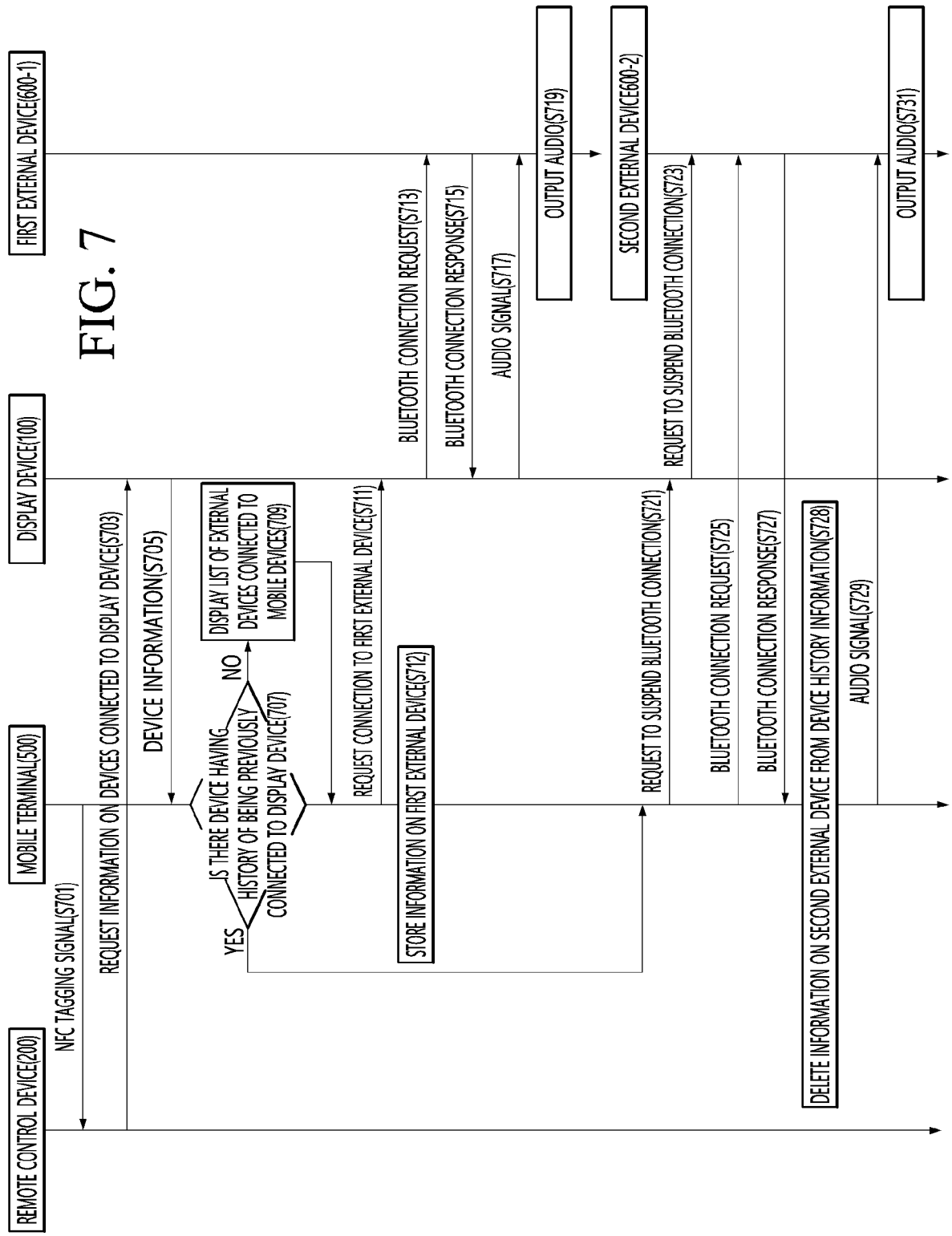

FIG. 8

```
800
vate BluetoothProfile.ServiceListener mA2dpListener = new BluetoothProfile.ServiceListener() {
    @Override
    public void onServiceConnected(int profile, BluetoothProfile a2dp) {
        LLog.e( info: "bthandover", msg: "profile : " + profile);
        LLog.e( info: "bthandover", msg: "connected size : " + a2dp.getConnectedDevices().size());
        mobileBtDevices.clear();
        for (BluetoothDevice device : a2dp.getConnectedDevices()) {  ─ 810
            int devicesClass = ((BluetoothClass) device.getBluetoothClass()).getDeviceClass();
            LLog.e( info: "bthandover", msg: "device : " + device.getAddress() + "name : " + device.getName() + " deviceClass : "
            if (deviceClass != 1084) {  ─ 830
                BtHandOverActivity.BTDevice bt = new BtHandOverActivity.BTDevice(device.getAddress(), device.getName(), type: "deviceClass : "
                bt.setBtDevice(device);
                mobileBtdevices.add(bt);
            }
        }
```

```
public void initHandoverMap (String deviceId, Device device) {
    in(mHandoverTVMap == null) mHandoverTVMap = new HashMap<>();
    LLog.e( info: "handover", msg: "device : " + device);
    LLog.e( info: "handover", msg: "device version : " +device.getThingsDevice().getData().getFloat( key: "web_os_version"));
    SmartTVInfo info = makeSmartTVInfo(device);
    mHandoverTVMap.put(deviceId, info);
}
```
1000

FIG. 11A

```
for (int i = 0; i < jsonArray.length(); i++) {
    JSONObject object = jsonArray.getJSONObject(i);
    if (object.has(name: "state") && object.getString(name: "state").equals("connected")) {
        if (object.has(name: "address") &&object.getString(name: "address").equals(handOverCandidate.getA
            smartTVInfo.setBtHandOveredAddr(handOverCandidate.getAddress());         ──1100
            smartTVInfo.setBtHandOverSent(true);
            LLog.e(info: "hanover", msg: "set handoversent : true");
            String toast = handOverCandidate.getName() + "is linked to the TV.";
            Toast.makeText(mContext, toast, Toast.LENGTH_LONG).show();
            finish();
        } else {
            LLog.e(info: "bthandover2", msg: "name, address, type is not exist");
        }
    }
}
```

```
2021-11-04T06:22:14.011598Z [6156.854097960] user.info
btaudiosnk [] bluetooth-audio-sink BTAUDIOSRC {}
reply[{:name":"airpod","listType":"discovered","state":"pairing","type":"
bt_audio","address":"F0:13:C3:B5:40:AD"}]  L_adapter_btaudio
```

```
2021-11-04T06:22:14.083342Z [6156.925843340] user.info
btaudiosrc [] bluetooth-audio-source H_DEVICE {} reply:
{:name":"airpod","listType":"discovered","state":"disconnected","type":
"bt_audio","address":"F0:13:C3:B5:40:AD"}]  L_handler_bt
```

1) ssap://com.webos.ervice.iotclient/getAccountInfoList '{}'
{
"returnValue": true,
"accountInfoList": [
{
"requester": "com.ewbos.app.homeconnect",
"energySaving": false,
"userId": "tvplusq@gmail.com",
"aliasName": "TV7",
"uerNo": "KR1908016157427"
},
{
"requester": "com.ewbos.app.homeconnect",
"energySaving": false,
"userId": "lgtvplus@gmail.com",
"aliasName": "",
"uerNo": "KR1907316157401"
}
],
"deviceId": "23a9725d52a6fb99dd3e53d28ff1d1b8e38746fa4ea7c8e29cb3ba78cfcd0584c0d353ce3dc2992f5b2ccf2b51f577235861eb5563d81140bb073f7d03848f12"
}

TERMINAL AND SYSTEM FOR FACILITATING BLUETOOTH CONNECTIONS

CROSS-REFERENCE TO RELATED APPLICATIONS

Pursuant to 35 U.S.C. § 119(a), this application claims the benefit of earlier filing date and right of priority to Korean Patent Application No. 10-2022-0066067, filed on May 30, 2022, the contents of which are hereby incorporated by reference herein in its entirety.

BACKGROUND OF THE INVENTION

1. Field of the Invention

The present disclosure relates to a technology for facilitating a Bluetooth connection process.

2. Discussion of the Related Art

Digital TV services using wired or wireless communication networks are becoming common. The digital TV services may provide various services that cannot be provided by existing analog broadcasting services.

For example, in the case of IPTV (Internet Protocol Television) and smart TV services, which are types of digital TV services, interactivity is provided so that users can actively select the types of programs to watch, the viewing time, and the like. IPTV and smart TV services may provide various additional services, such as Internet search, home shopping, online games, or the like based on interactivity.

Also, the TV may be linked with an external device through Bluetooth communication. In particular, as Bluetooth earphones and/or speakers are becoming more and more widespread, the need to easily connect and use Bluetooth earphones and speakers with a TV is increasing.

However, in the related art, in order to connect an external device to a TV through Bluetooth communication, where the external device is already Bluetooth connected to a terminal such as a smart phone, a complicated process needs to be performed.

In addition, TV may scan nearby Bluetooth devices and display a list of connectable devices. However, in the case of devices having different Bluetooth addresses but having the same name, it is inconvenient for the user to distinguish between devices and know which device to connect to.

SUMMARY OF THE INVENTION

An object of the present disclosure is to enable an external device, which is already Bluetooth connected to a terminal, to be connected to a display device without a complicated procedure.

An object of the present disclosure is to enable a Bluetooth device that could be connected only through several procedures and complicated processes to be easily connected to a TV and a mobile device with one tagging.

According to an embodiment of the present disclosure, a terminal includes a display; a Near Field Communication (NFC) circuit configured to perform NFC communication with a remote control device of a display device; a Bluetooth circuit; and a processor configured to transmit, to the display device, a request to establish Bluetooth connection with an external device Bluetooth-connected to the terminal in response to a tagging signal transmitted to the remote control device.

According to an embodiment of the present disclosure, a system includes a display device; a remote control device configured to control operation of the display device; and a terminal configured to transmit, to the display device, a request to establish Bluetooth connection with an external device Bluetooth-connected to the terminal according to tagging with the remote control device.

According to an embodiment of the present disclosure, a method of establishing Bluetooth connections for a display device using a remote control device and a terminal comprises transmitting, from the terminal to the remote control device, an NFC tagging signal; and transmitting, to the display device, a request for the display device to establish Bluetooth connection with a selected external device Bluetooth-connected to the terminal in response to the NFC tagging signal.

According to the embodiments of the present disclosure, the user does not have to worry about which device to connect or make a mistake, and only tags the terminal to the remote control device to omit a complicated connection process, thus greatly improving convenience.

BRIEF DESCRIPTION OF THE DRAWINGS

FIGS. 6A to 6C are diagrams for describing a problem occurring in the process of connecting an external device connected to a mobile terminal to a display device according to the related art.

FIG. 7 is a ladder diagram for describing a method of operating a system according to an embodiment of the present disclosure.

FIG. 8 is a diagram for describing an example of filtering external devices to be included in an external device list among external devices connected to a mobile terminal through Bluetooth according to an embodiment of the present disclosure.

FIGS. 11A to 11C are diagrams for describing a scenario for identifying and notifying Bluetooth connection targets of an external device when a mobile terminal is tagged to a remote control device.

FIGS. 12A and 12B are diagrams for describing information used to detect a Bluetooth connection state of an external device according to an embodiment of the present disclosure.

FIG. 14 is a diagram for describing account information received by an external display device from a server according to an embodiment of the present disclosure.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, and including input functions such as a handwritten input device, a touch screen, and the like. Alternatively, a more traditional interface such as a remote control, including a spatial remote control, may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
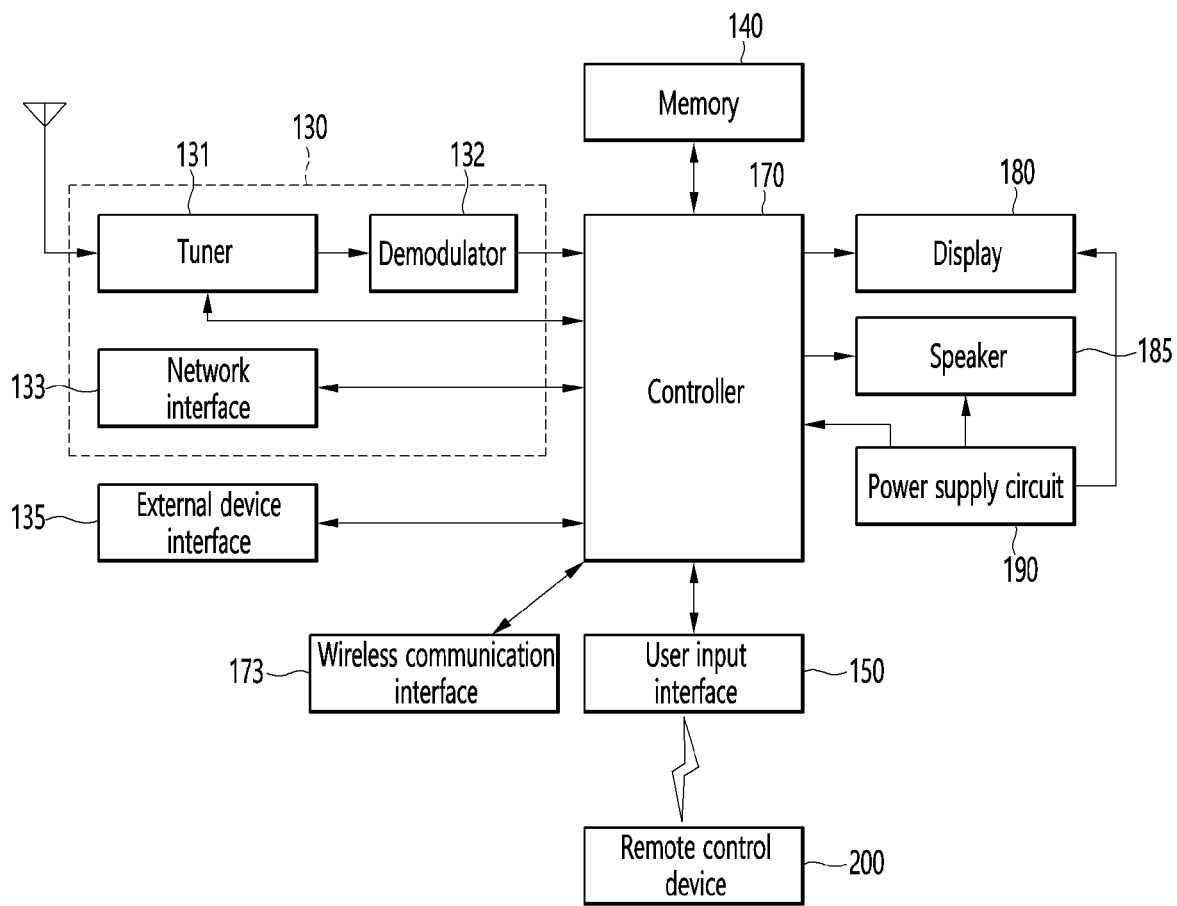
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 to 3.

Figure 2:
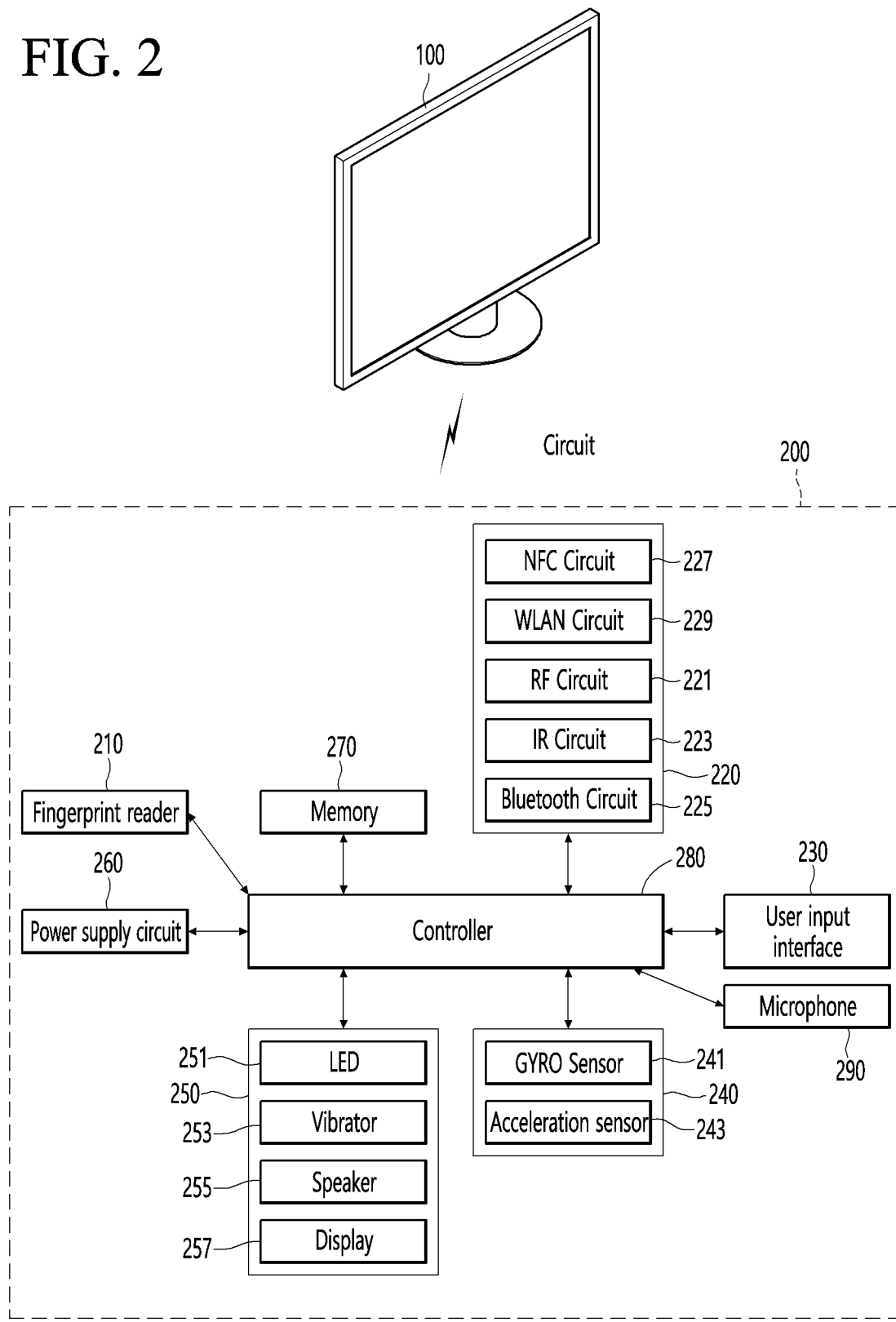
FIG. 2 is a block diagram of a remote control device according to an embodiment of the present disclosure.
Figure 3:
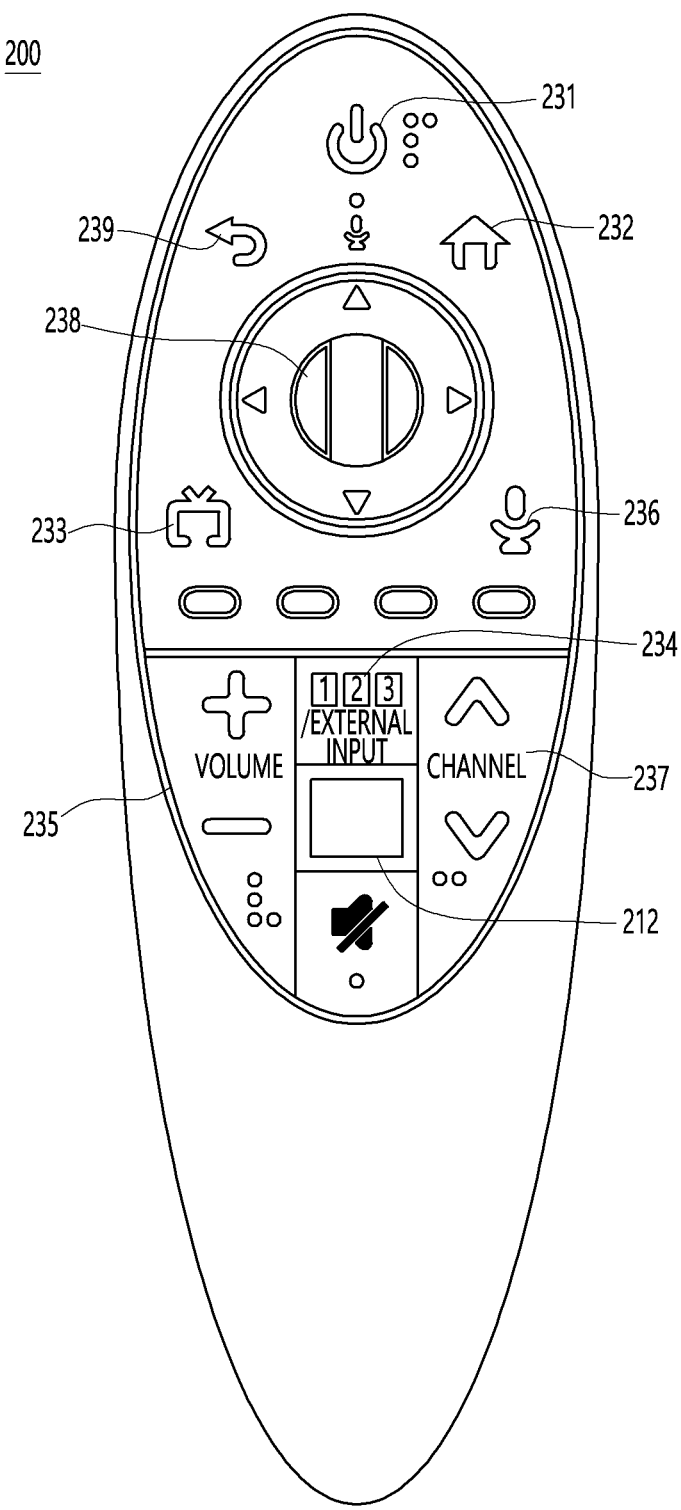
FIG. 3 shows an example of an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
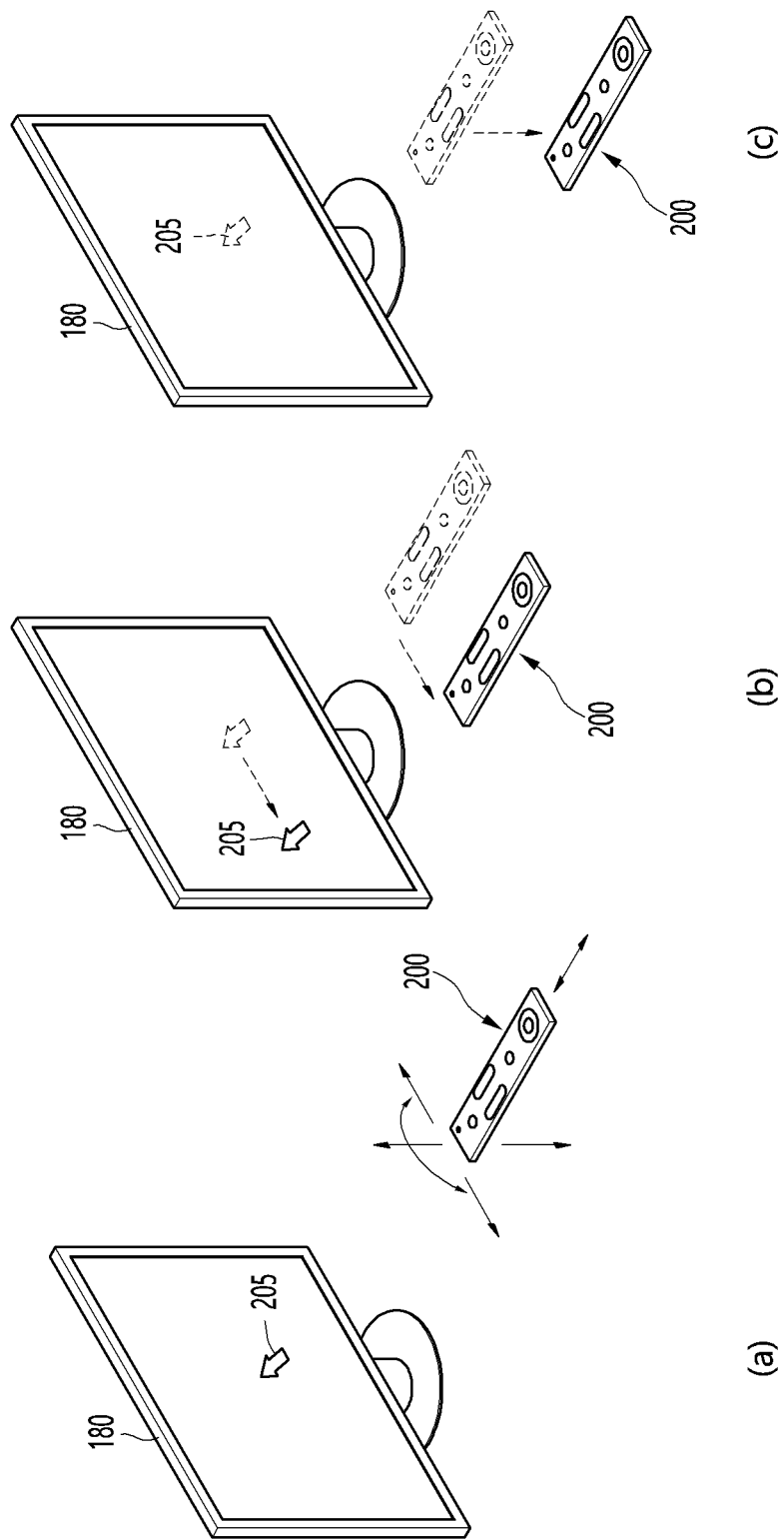
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
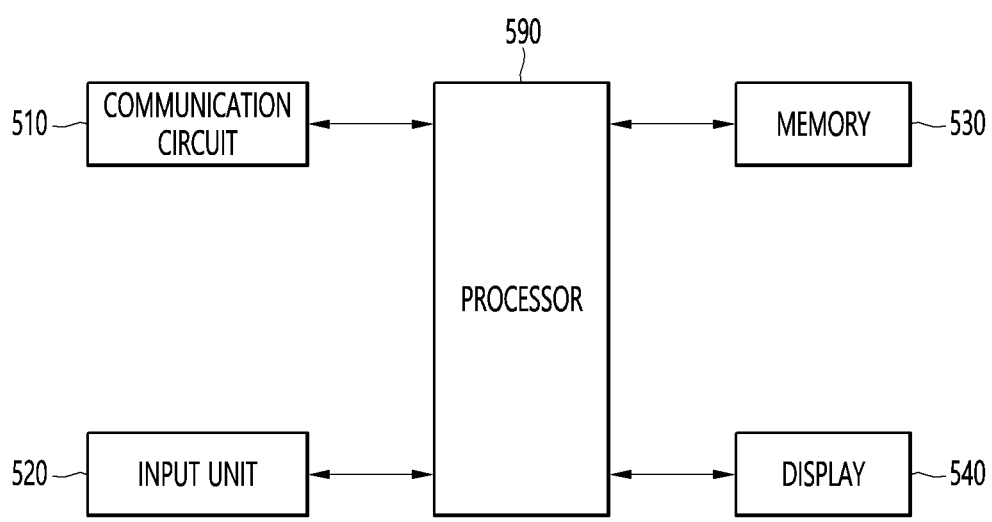
FIG. 5 is a block diagram for describing a configuration of a mobile terminal according to an embodiment of the present disclosure.

FIG. 5 is a block diagram for describing a configuration of a mobile terminal according to an embodiment of the present disclosure.

The mobile terminal 100 may be implemented by a stationary device or a mobile device, such as a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a desktop computer, and the like.

Referring to FIG. 5, the mobile terminal 100 may include a communication circuit 510, an input unit 520, a memory 530, a display 540, and a processor 590.

The communication circuit 510 may transmit/receive data to and from external devices such as other mobile terminals or servers using wired/wireless communication technologies.

The communication circuit 510 may perform communication using any one communication standard among GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

In this case, the input unit 520 may include a camera for inputting a video signal, a microphone for receiving an audio signal, and a user input unit for receiving information from a user.

The camera or the microphone may be treated as a sensor, and the signal acquired from the camera or the microphone may be referred to as sensing data or sensor information.

The memory 530 may store various software and data related to the operation of the mobile terminal 500.

The display 540 may display an image signal received from the outside.

The processor 590 may control the overall operation of the mobile terminal 500.

When the connection of an external device is required to perform the operation of the mobile terminal 500, the processor 590 may generate a control signal for controlling the external device and may transmit the generated control signal to the external device.

The processor 590 may acquire intention information for the user input and may determine the user's requirements based on the acquired intention information.

The processor 590 may control at least part of the components of the mobile terminal 500 so as to drive an application program stored in memory 170.

The processor 590 may operate two or more of the components included in the mobile terminal 500 in combination so as to drive the application program.

Figure 6A:
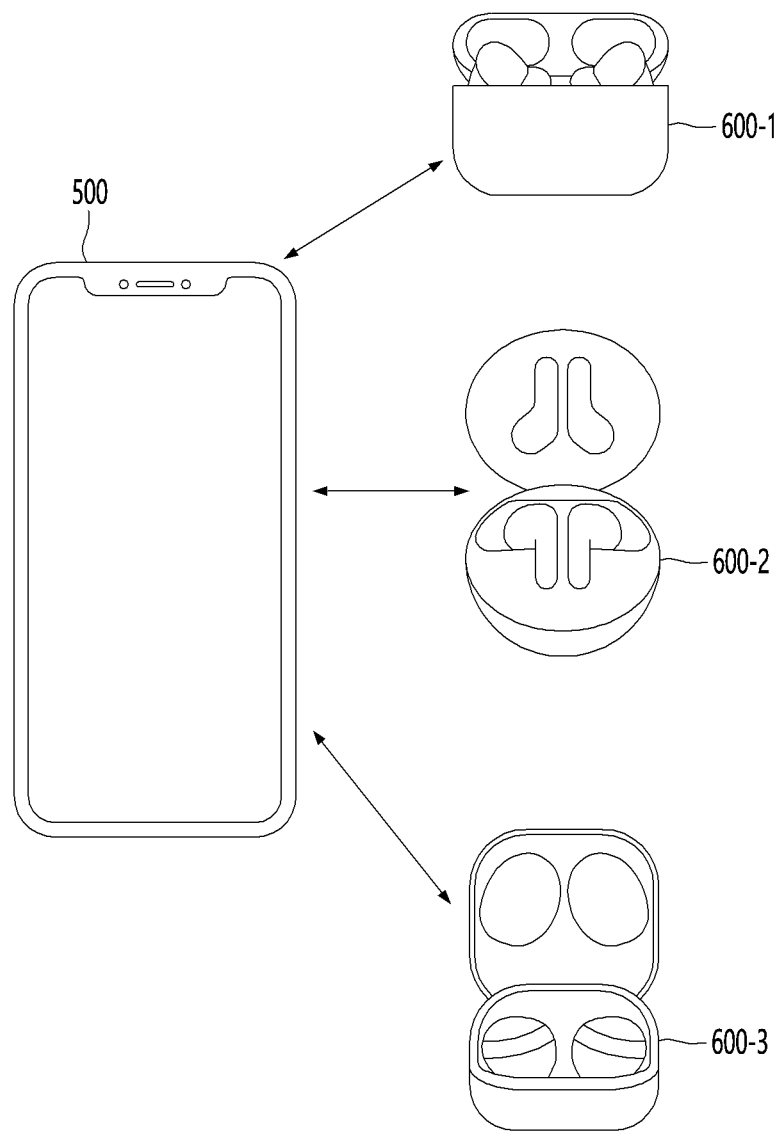

FIGS. 6A to 6C are examples for describing a problem occurring in the process of connecting an external device connected to a mobile terminal to a display device according to the related art.

Referring to FIG. 6A, a mobile terminal 500 may be connected to any one or two of a first external device 600-1, a second external device 600-2, and a third external device 600-3 through a Bluetooth communication standard.

Each of the first external device 600-1, the second external device 600-2, and the third external device 600-3 may be a Bluetooth earphone.

A process of disconnecting Bluetooth connection with the mobile terminal 500 and connecting to the display device 100 is different for each type of device.

In the case of a first external device 600-1, a user puts earphones into the case and waits for a predetermined time in order to disconnect connection with the mobile terminal 500. Thereafter, the user erases the first external device 600-1 from the settings of the mobile terminal 500, and presses and holds a pairing button provided in the first external device 600-1 for a predetermined time. Thereafter, the user opens a case lid to enable the first external device 600-1 to enter a pairing standby mode and then attempt to connect to the display device 100.

In the case of a second external device 600-2, the user deletes the second external device 600-2 from a list of connected devices displayed on the mobile terminal 500. Thereafter, the user mounts earphones in a charging case and presses a pairing button for a predetermined time with the charging case lid open. Thereafter, the connection of the second external device 600-2 is initialized to automatically switch to the pairing mode and attempt to connect to the display device 100.

In the case of a third external device 600-3, the user mounts earphones in a charging case and presses touchpads of the both earphones for a predetermined time or longer at the same time. The third external device 600-3 attempts to connect to the display device 100 after the battery status indicator has blinked green.

Referring to FIG. 6B, the display device 100 displays on the display 180 a wireless speaker menu screen 610 for selecting a speaker to output audio.

When any one of the first to third external devices 600-1, 600-2, and 600-3 is capable of Bluetooth connection, the display device 100 may display information on Bluetooth-connectable devices in a connectable device list. The device information (Device 2) may be a nickname of a device, but this is only an example.

The display device 100 performs Bluetooth connection with the second external device 600-2 corresponding to the device information (Device 2) as the Bluetooth-connectable device information (Device 2) is selected.

According to the prior art as described above, many procedures are required to connect an external device, which is already connected to the mobile terminal 500 via Bluetooth, to the display device 100. In addition, since the connection procedure is different for different types (or brands) of external devices, inconvenience may be caused to the user.

Meanwhile, referring to FIG. 6C, the display device 100 scans nearby Bluetooth-connectable devices, and displays information on connectable devices in the connectable device item based on the scan information 620.

However, as shown in FIG. 6C, since the same connectable device names will be displayed in the connectable device list in a situation in which three connectable devices all have the same name (621, 623, and 625), there is a problem in that it is difficult for the user to know which device the user wants to connect to.

FIG. 7 is a ladder diagram for describing a method of operating a system according to an embodiment of the present disclosure.

In the following embodiment, it is assumed that the first external device 600-1 is in Bluetooth connection with the mobile terminal 500, and the second external device 600-2 is in connection with the display device 100.

In this example, the first external device 600-1 operates as a sink device that outputs audio transmitted by the mobile terminal 500, and the second external device 600-2 operates as a sink device that outputs audio transmitted by the display device 100.

Referring to FIG. 7, the processor 590 of the mobile terminal 500 transmits a Near Field Communication (NFC) tagging signal to the remote control device 200 through the communication circuit 510 (S701).

The NFC tagging signal may be a signal to cause an external device, currently being Bluetooth-connected to the mobile terminal 500, to connect to the display device 100.

The communication circuit 510 may include an NFC circuit.

The remote control device 200 requests information on Bluetooth-connected devices from the display device 100 based on the NFC tagging signal (S703).

When the NFC tagging signal is detected, the remote control device 200 may transmit to the display device 100 a request to transmit the information on devices Bluetooth connected to the display device 100 to the mobile terminal 500.

The remote control device 200 may transmit the corresponding request to the display device 100 through IR, IP, or Bluetooth.

The controller 170 of the display device 100 transmits the information on devices Bluetooth connected to the display device 100 to the mobile terminal 500 in response to the request for device information received from the remote control device 200 (S705).

The information on Bluetooth-connected devices may include a device name and a Bluetooth address of each device.

The processor 590 of the mobile terminal 500 determines, based on the device information, whether there is a device having a history of being previously connected to the display device 100 through Bluetooth (S707).

In an embodiment, the memory 530 of the mobile terminal 500 stores device history information on devices that has been connected to the display device 100 through Bluetooth. The device history information may include a device name and a Bluetooth address of each device.

The processor 590 of the mobile terminal 500 may compare the device information received from the display device 100 with the device history information stored in the memory 530. The processor 590 of the mobile terminal 500 may determine whether a Bluetooth address of a device included in the device information exists in the device history information, based on the comparison result.

In another embodiment, the database of a device management application installed in the mobile terminal 500 may store information on a device that has been connected to the display device 100 through Bluetooth. The database may be included in a server that provides the device management application.

The processor 590 of the mobile terminal 500 may request, from the server, information on whether a Bluetooth address of the device included in the device information exists in the device history information, and receive a result responding to the request from the server.

When it is determined based on the device information that there is no device that has previously been connected to the display device 100 through Bluetooth, the processor 590 of the mobile terminal 500 displays an external device list including information on one or more external devices Bluetooth connected to the mobile terminal 500 on the display 540 (S709).

In an embodiment, when the Bluetooth address of a device included in the device information does not exist in the device history information stored in the memory 530, the processor 590 may display an external device list including information on one or more external devices connected to the mobile terminal 500 itself through Bluetooth on the display 540.

In another embodiment, when information is received from a server indicating that the Bluetooth address of a device included in the device information does not exist in connected device history, the processor 590 may display an external device list including information on one or more external devices connected to the mobile terminal 500 itself through Bluetooth on the display 540.

When a plurality of external devices are Bluetooth-connected to the mobile terminal 500, the external device list may only include external devices satisfying a predetermined condition.

Details will be described with reference to FIG. 8.

FIG. 8 is a diagram for describing an example of filtering external devices to be included in an external device list among external devices connected to a mobile terminal through Bluetooth according to an embodiment of the present disclosure.

Referring to FIG. 8, Bluetooth profile information 800 of an external device which is connected to the mobile terminal 500 is shown.

The Bluetooth profile information 800 may be received from a currently connected external device.

The Bluetooth profile information 800 may include an Advanced Audio Distribution Profile (A2DP) class 810 indicating whether the external device is a device having a Bluetooth music player profile and a device class 830 indicating the type of the external device.

The mobile terminal 500 may first perform filtering to select devices having the A2DP profile, using the A2DP classes 810 of the plurality of external devices.

Second, the mobile terminal 500 may perform filtering to select devices whose ID value of the device class 830 is not "1084" among the devices which have been subjected to the first filtering.

A device whose ID value of the device class 830 is "1084" may be a TV or a computer.

The mobile terminal 500 may obtain only the devices that have undergone the secondary filtering as described above among the plurality of external devices, and may generate an external device list including the obtained external devices.

The mobile terminal 500 may display the created external device list on the display 540.

Again, description will be given with reference to FIG. 7.

The processor 590 of the mobile terminal 500 transmits to the display device 100 a connection request including information on the first external device 600-1 among one or more external devices included in the external device list (S711).

According to an embodiment, the external device list may include a plurality of external devices. The processor 590 may transmit information on the first external device 600-1 to the display device 100 in response to receiving a command for selecting the first external device 600-1 from among the plurality of external devices.

The selected first external device 600-1 may be a device that is connected to the mobile terminal 500 via Bluetooth and outputs audio transmitted by the mobile terminal 500.

That is, the selected first external device 600-1 may be a device being in Bluetooth connection with the mobile terminal 500 and currently in use.

In another embodiment, the external device list may include only the first external device 600-1. In this case, the processor 590 may automatically transmit information on the first external device 600-1 to the display device 100. That is, the processor 590 may directly transmit information on the first external device 600-1 to the display device 100 without a separate input procedure such as selection by a user.

The first external device 600-1 may be a device being in Bluetooth connection with the mobile terminal 500 and currently in use.

Meanwhile, when the mobile terminal 500 is in Bluetooth connection with the first external device 600-1, the mobile terminal 500 may disconnect the Bluetooth connection with the first external device 600-1, and transmit information on the first external device 600-1 to the display device 100.

The information on the first external device 600-1 may include the name and Bluetooth address of the first external device 600-1.

The mobile terminal 500 and the display device 100 may communicate with each other through a Web Socket. The Web Socket may be a communication protocol that provides a dynamic bidirectional connection channel. The mobile terminal 500 and the display device 100 may include a communication circuit for Web Socket communication.

The mobile terminal 500 transmits a connection request including information on the first external device 600-1 to the display device 100 to cause the display device 100 to connect to the first external device 600-1.

Meanwhile, the processor 590 of the mobile terminal 500 may store the information on the first external device 600-1 transmitted to the display device 100 in the memory 530 or the database of the server (S712).

In an embodiment, the processor 590 may store the device identifier of the display device 100 as a key and the Bluetooth address of the first external device 600-1 as a value in the form of a HashMap for identification from other display devices.

The controller 170 of the display device 100 may transmit a request for Bluetooth connection to the first external device 600-1 based on the connection request including information on the first external device 600-1 received from the mobile terminal 500 (S713).

The controller 170 of the display device 100 may transmit the request for Bluetooth connection to the first external device 600-1 using the Bluetooth address of the first external device 600-1 through a Bluetooth interface.

The controller 170 of the display device 100 may receive a response for Bluetooth connection from the first external device 600-1 through the Bluetooth interface (S715).

The controller 170 of the display device 100 has established the Bluetooth connection with the first external device 600-1 as the response for Bluetooth connection is received.

The controller 170 of the display device 100 may transmit an audio signal to the external device 600 through the Bluetooth interface (S717), and the first external device 600-1 may output audio based on the received audio signal (S719).

As described above, in an embodiment of the present disclosure, the mobile terminal 500 may transmit the address of a Bluetooth device, being connected to the mobile terminal 500 and in use, to the display device 100 to cause the display device 100 to request connection from the corresponding Bluetooth device.

Accordingly, the user does not have to worry about or make a mistake about which device to connect, and only tags the mobile terminal 500 to the remote control device 200 to omit a complicated connection process to connect the display device 100 with the first external device 600-1, thus greatly improving convenience On the other hand, when the processor 590 of the mobile terminal 500 determines that there is a device (such as second external device 600-2) that has been previously connected to the display device 100 through Bluetooth, based on the device information, the processor 590 of the mobile terminal 500 may transmit to the display device 100 a Bluetooth connection suspension request to suspend Bluetooth connection with the second external device 600-2 (S721).

That is, the processor 590 of the mobile terminal 500 may compare the device history information described in S707 with the device information received from the display device (S705) to determine whether the device history information includes the Bluetooth address of the devices connected to the display device 100 which are included in the device information (S705).

When the device history information includes the Bluetooth address of a device (for example, second external device 600-2) connected to the display device and included in the device information, the processor 590 may transmit to the display device 100 a Bluetooth connection suspension request to disconnect the Bluetooth connection between the second external device 600-2 and the display device 100.

The processor 590 of the mobile terminal 500 disconnects connection between the display device 100 and the second external device 600-2 and re-establishes the Bluetooth connection between the mobile terminal 500 and the second external device 600-2.

The controller 170 of the display device 100 may transmit a Bluetooth connection suspension request to disconnect the Bluetooth connection with the second external device 600-2 to the second external device 600-2 according to the Bluetooth connection suspension request received from the mobile terminal 500 (S723).

Thereafter, the processor 590 of the mobile terminal 500 may transmit a Bluetooth connection request for Bluetooth connection between the mobile terminal 500 and the second external device 600-2 (S725), and receive a response for Bluetooth connection from the second external device 600-2 (S727).

Accordingly, the Bluetooth connection between the mobile terminal 500 and the second external device 600-2 may be established.

Meanwhile, as the Bluetooth connection between the mobile terminal 500 and the second external device 600-2 is established, the processor 590 of the mobile terminal 500 may delete information on the second external device 600-2 from the device history information. (S728).

According to an embodiment, the processor 590 may delete information on the second external device 600-2 included in the device history information stored in the memory 240.

In another embodiment, the processor 590 may transmit a command to the server to delete information on the second external device 600-2 stored in the database of the device management application.

The processor 590 may delete the identifier of the display device 100 and the Bluetooth address of the second external device 600-2 matched thereto, which are stored in the form of a HashMap.

The processor 590 of the mobile terminal 500 may transmit an audio signal to the second external device 600-2 (S729), and the second external device 600-2 may output audio based on the received audio signal (S731).

Accordingly, the mobile terminal 500 may operate as a source device for transmitting audio, and the second external device 600-2 may operate as a sink device for outputting the transmitted audio.

As described above, in an embodiment of the present disclosure, the mobile terminal 500 may perform control such that a Bluetooth device connected to the display device 100 is instead connected to the mobile terminal 500 itself.

Accordingly, the user tags the mobile terminal 500 to the remote control device 200 to omit a complicated connection process, thus greatly improving convenience.

Figure 9A:
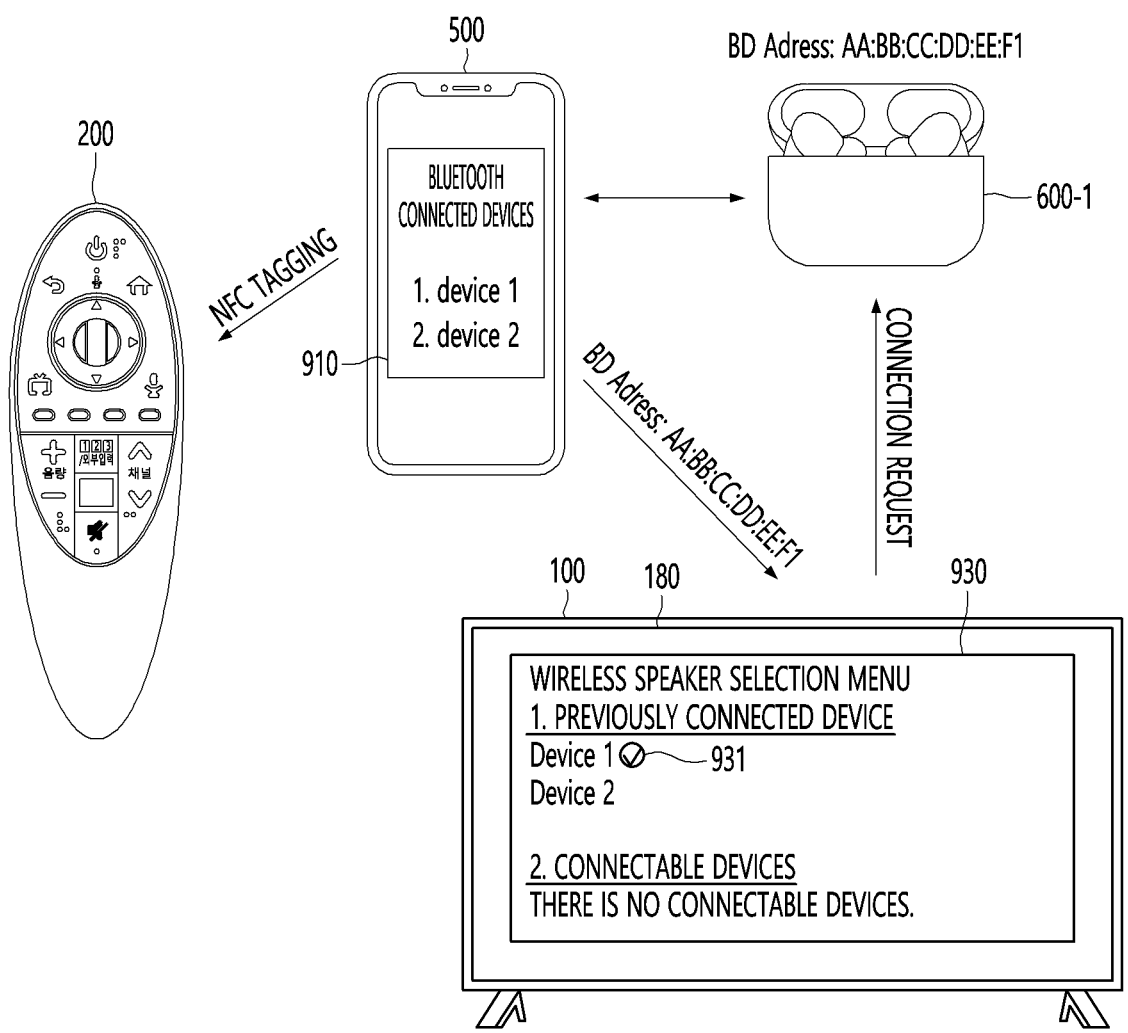
FIG. 9A is a diagram for describing a process of connecting an external device Bluetooth-connected to a mobile terminal with a display device through NFC tagging according to an embodiment of the present disclosure.
Figures 9B, 10:
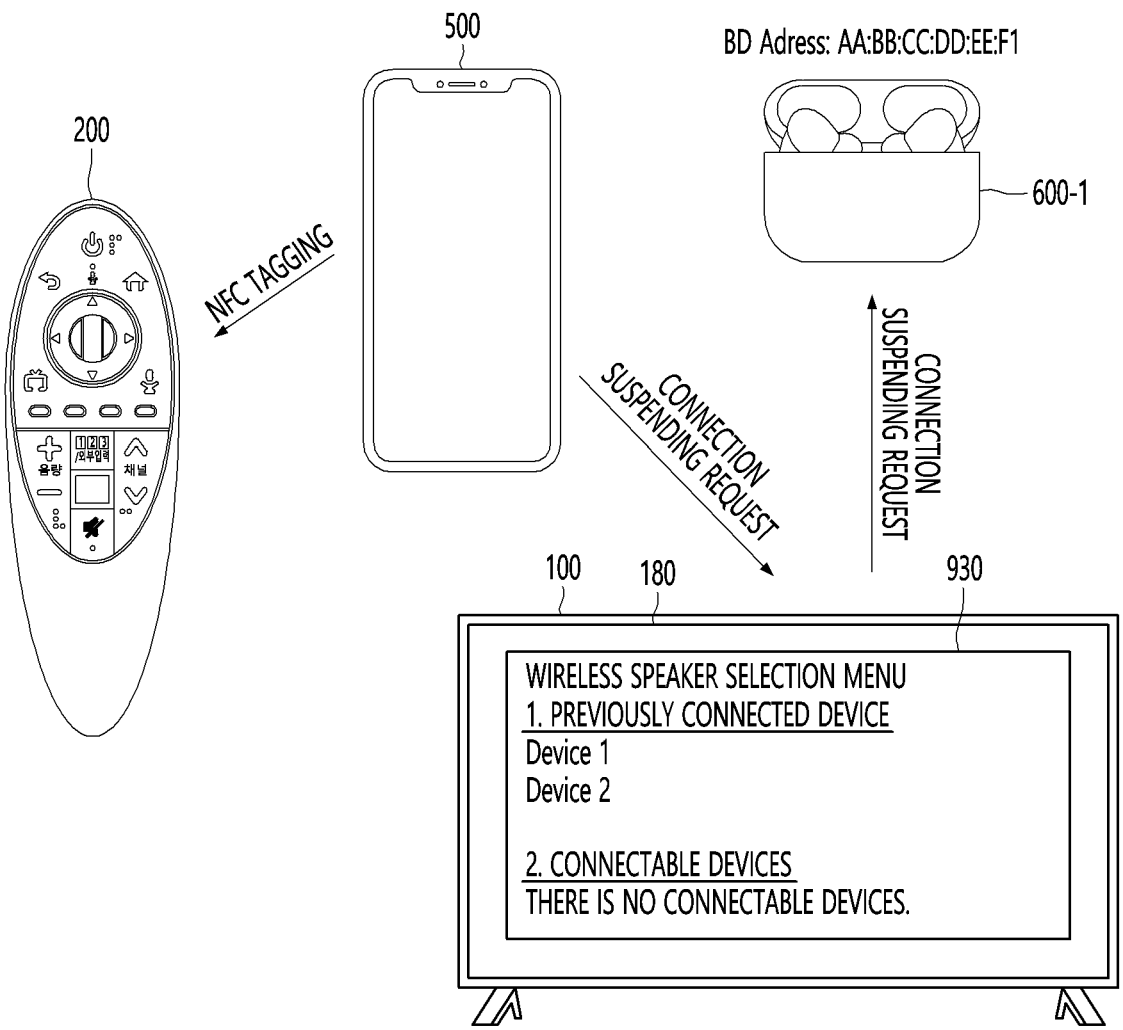
FIG. 9B is a diagram for describing a process of re-connecting an external device Bluetooth-connected to a display device with a mobile terminal through NFC re-tagging.
FIG. 10 is a diagram for describing information stored by a mobile terminal after a display device and an external device are connected in response to a connection request from the mobile terminal according to an embodiment of the present disclosure.

FIG. 9A is a diagram for describing a process of connecting an external device Bluetooth-connected to a mobile terminal with a display device through NFC tagging according to an embodiment of the present disclosure, and FIG. 9B is a diagram for describing a process of re-connecting an external device Bluetooth-connected to a display device with a mobile terminal through NFC re-tagging.

First, description will be given with reference to 9A.

In this example, the mobile terminal 500 is connected with the first external device 600-1 through Bluetooth communication.

The Bluetooth address of the first external device 600-1 may be AA:BB:CC:DD:EE:F1.

When the mobile terminal 500 is NFC-tagged to the remote control device 200, the mobile terminal 500 may display an external device list 910 including devices that are Bluetooth-connected to the mobile terminal 500.

The external device list 910 may include only devices having the A2DP profile and devices having device class identifiers other than 1084, as discussed above.

When the first external device 600-1 is selected from among the devices included in the external device list 910, the mobile terminal 500 may transmit to the display device 100 through a Web Socket a connection request to connect the first external device 600-1 with the display device 100.

The connection request may include the Bluetooth address of the first external device 600-1.

The mobile terminal 500 may disconnect the Bluetooth connection with the first external device 600-1 while transmitting the connection request to the display device 100.

The display device 100 may reflect information indicating that the first external device 600-1 is connected in a wireless speaker selection menu screen 930 using the information on the first external device 600-1 received from the mobile terminal 500.

An indicator 931 indicating that the first external device 600-1 is connected to the display device 100 may be displayed on the wireless speaker selection menu screen 930.

The display device 100 may attempt Bluetooth connection with the first external device 600-1 using the Bluetooth address of the first external device 600-1 received from the mobile terminal 500.

For this, the Bluetooth connection may comply with the BT Handover Connection flow of the Bluetooth communication standard.

After having established the Bluetooth connection with the first external device 600-1, the display device 100 may transmit audio to the first external device 600-1, and the first external device 600-1 may output the received audio.

As described above, according to an embodiment of the present disclosure, a user can connect an external device connected to the mobile terminal 500 to the display device 100 only by tagging the mobile terminal 500 to the remote control device 200.

Accordingly, it is possible to omit a complicated connection process, thus greatly improving user convenience.

Next, a description will be given with reference to FIG. 9B.

FIG. 9B may be a scenario to be performed after the operation of FIG. 9A.

Thus, in this example, the display device 100 is connected with the first external device 600-1 via Bluetooth.

When the mobile terminal 500 is NFC-tagged to the remote control device 200, the mobile terminal 500 may transmit to the display device 100 a Bluetooth connection suspension request to suspend the Bluetooth connection between the display device 100 and the first external device 600-1.

The display device 100 may transmit a Bluetooth connection suspension request to the first external device 600-1 according to the Bluetooth connection suspension request received from the mobile terminal 500.

After terminating the connection with the first external device 600-1, the display device 100 may terminate display of the indicator 931 on the wireless speaker selection menu screen 930.

Thereafter, the mobile terminal 500 may transmit a Bluetooth connection request to the first external device 600-1 to perform Bluetooth connection between the mobile terminal 500 and the first external device 600-1.

For this, the Bluetooth connection may comply with the BT Handover Connection flow of the Bluetooth communication standard.

As described above, according to an embodiment of the present disclosure, a user can connect an external device connected to the display device 100 with the mobile terminal 500 only by tagging the mobile terminal 500 to the remote control device 200.

Accordingly, it is possible to omit a complicated connection process, thus greatly improving user convenience.

FIG. 10 is a diagram for describing information stored by a mobile terminal after a display device and an external device are connected in response to a connection request from the mobile terminal according to an embodiment of the present disclosure.

Referring to FIG. 10, the mobile terminal 500 may transmit information on a selected external device to the display device 100 and then store a hash map 1000, in which an identifier (ID) of the display device 100 is matched with the information (info) of the external device, in the memory 530.

The information (info) of the external device may include a Bluetooth address of the external device.

The HashMap 1000 may be stored in order for the mobile terminal 500 to store an external device connected to the specific display device 100.

The mobile terminal 500 may reconnect a Bluetooth device connected to the specific display device 100 with the mobile terminal 100 again by using the HashMap 1000 through NFC re-tagging.

Figure 11B:
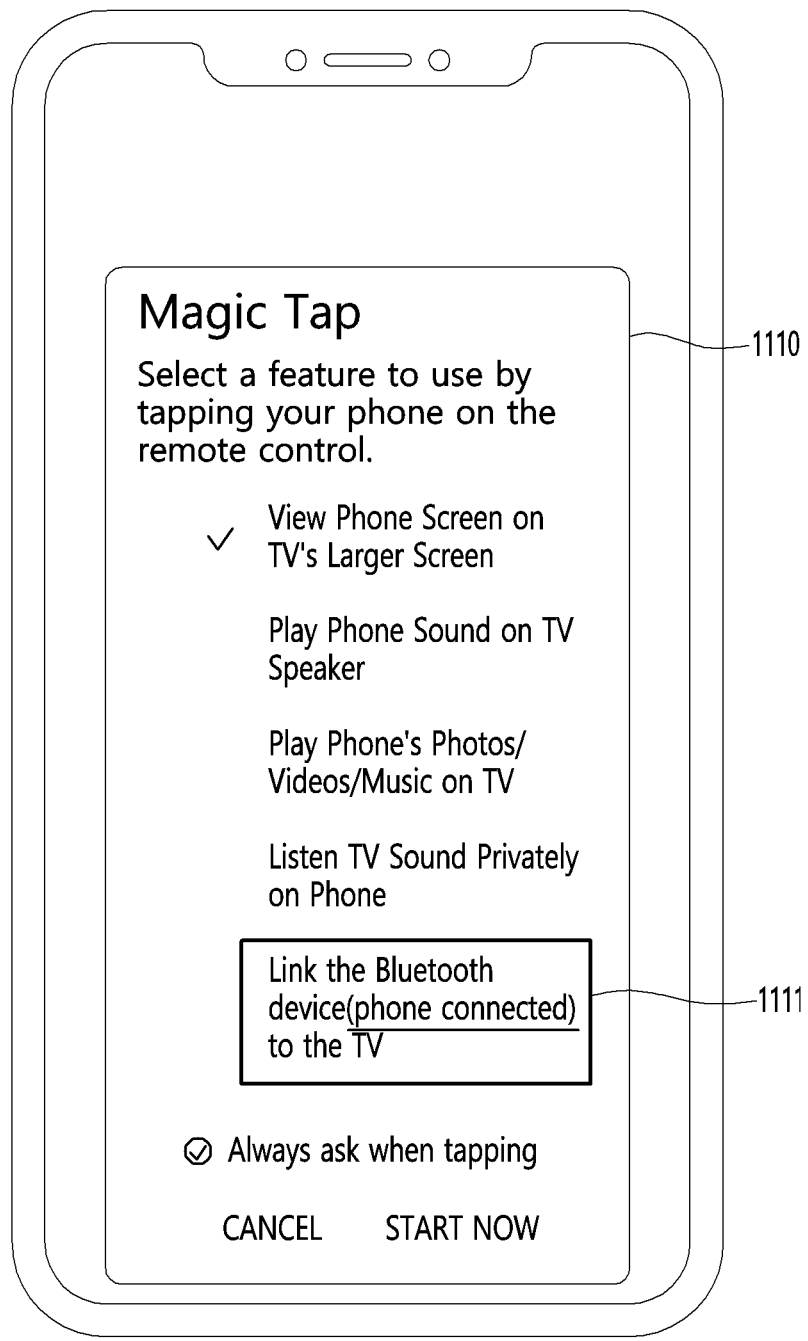
Figure 11C:
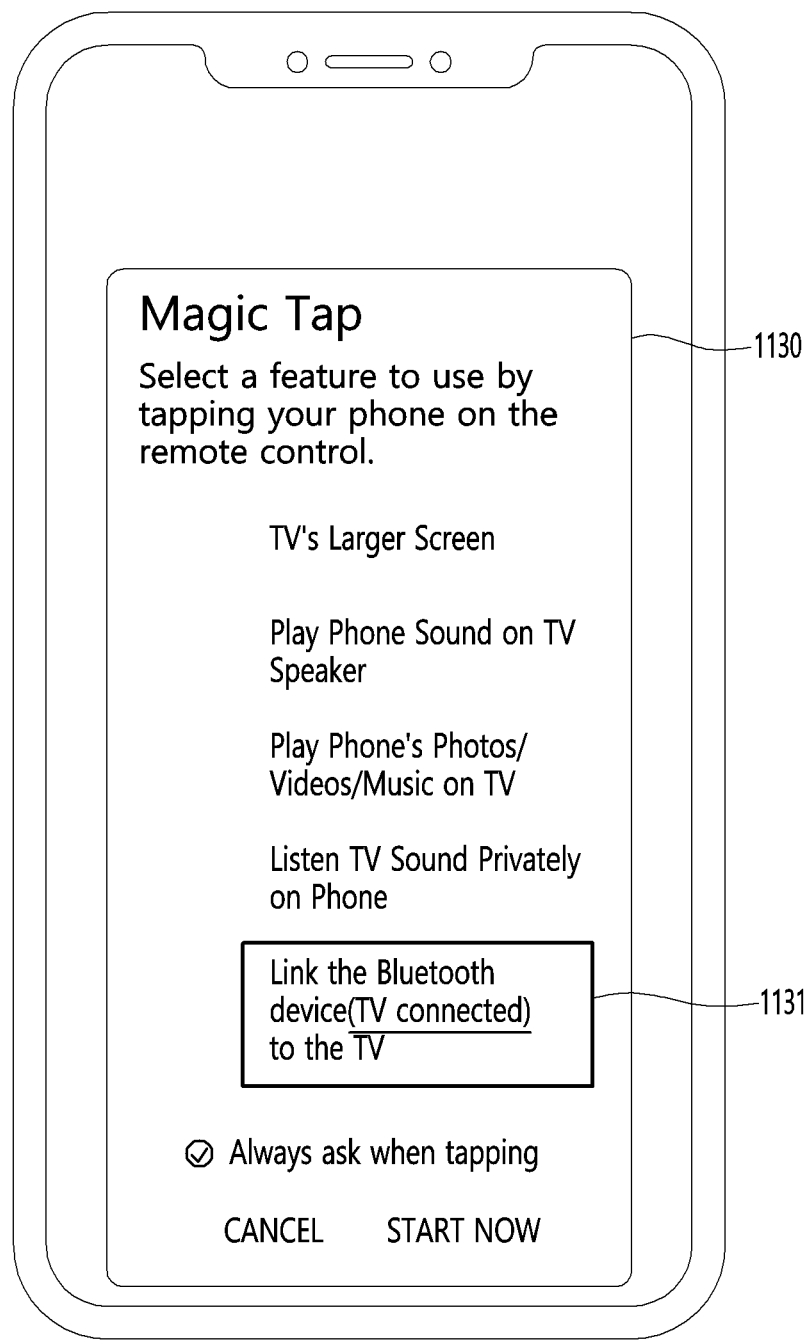

FIGS. 11A to 11C are diagrams for describing a scenario for identifying and notifying Bluetooth connection targets of an external device when a mobile terminal is tagged to a remote control device.

Referring to FIG. 11A, flag information 1100 indicating information on a device that is Bluetooth-connected to an external device is shown. The flag information 1100 may be information received from an external device according to a request of the mobile terminal 500.

When the value of the flag information 1100 is true, the value may indicate that the external device is connected to the display device 100, and when the value of the flag information 1100 is false, the value may indicate that the external device is connected to the mobile terminal 500.

When the mobile terminal 500 is NFC-tagged to the remote control device 200, the mobile terminal 500 may display pop-up windows 1110 and 1130 as shown in FIGS. 11B and 11C.

Each of the pop-up windows 1110 and 1130 may include functions that can be used as the mobile terminal 500 is tagged (or tapped) to the remote control device 200.

The first pop-up window 1110 of FIG. 11B may include a first Bluetooth-operable menu 1110 indicating that a Bluetooth device (external device) is connectable to the display device 100.

Specifically, the first Bluetooth-operable menu 1110 may be a menu indicating that a Bluetooth device connected to the mobile terminal 500 is connectable to the display device 100.

The first Bluetooth-operable menu 1110 may be displayed when the value of the flag information 1100 of FIG. 11A is false.

The second pop-up window 1130 of FIG. 11C may include a second Bluetooth-operable menu 1130 indicating that a Bluetooth device (external device) is connectable to the mobile terminal 500.

Specifically, the second Bluetooth-operable menu 1130 may be a menu indicating that a Bluetooth device connected to the display device 100 is connectable to the mobile terminal 500.

The second Bluetooth-operable menu 1130 may be displayed when the value of the flag information 1100 of FIG. 11A is true.

The user can easily and quickly check which device the Bluetooth device is to be linked with through the first and second Bluetooth-operable menus 1110 and 1130 displayed according to tagging.

FIGS. 12A and 12B are diagrams for describing information used to detect a Bluetooth connection state of an external device according to an embodiment of the present disclosure.

A first message 1210 of FIG. 12A and a second message 1230 of FIG. 12B may be messages transmitted to the mobile terminal 500 by the display device 100.

The first message 1210 may indicate that the Bluetooth connection state between the display device 100 and an external device is a <paring> state.

The second message 1230 may indicate that the Bluetooth connection state between the display device 100 and the external device is a <disconnected> state. The Bluetooth connection state information included in the second message 1230 may include a case in which the display device 100 is powered off.

When receiving the second message 1230 after receiving the first message 1210, the mobile terminal 500 may detect that the Bluetooth connection between the display device 100 and the external device is disconnected.

When detecting that the Bluetooth connection between the display device 100 and the external device is disconnected, the mobile terminal 500 may perform Bluetooth connection with the external device. That is, the mobile terminal 500 may perform step S725 and subsequent steps of FIG. 7.

Figure 13:
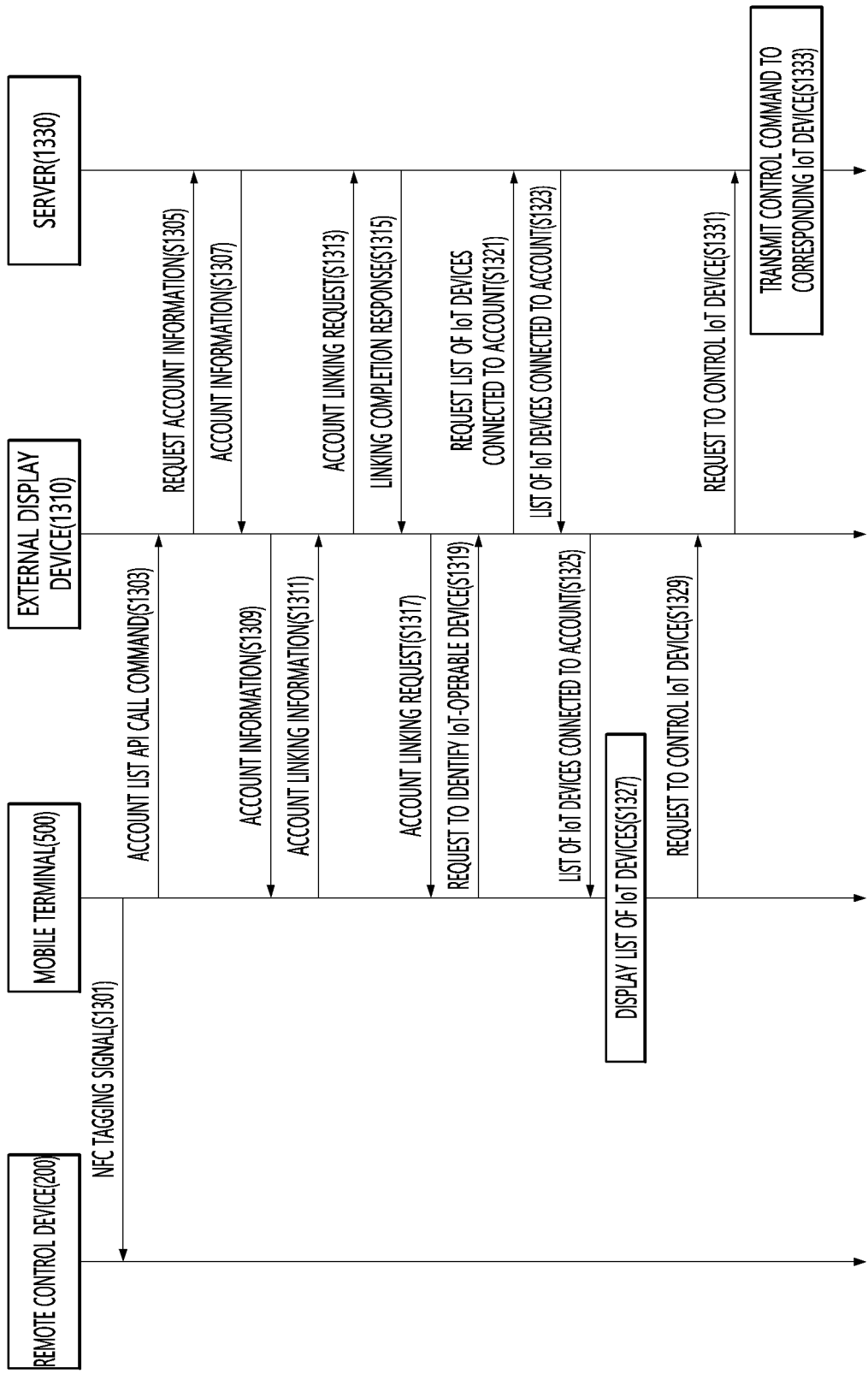
FIG. 13 is a ladder diagram for describing an embodiment of linking an account and an IoT device of the account in an external display device through NFC tagging.

FIG. 13 is a ladder diagram for describing an embodiment of linking an account and an IoT device of the account in an external display device through NFC tagging.

In the example of FIG. 13, the external display device 1310 may include components of the display device 100 described in FIG. 1.

The server 1330 may be a device for linking with the device management application installed in the mobile terminal 500.

Referring to FIG. 13, the mobile terminal 500 may transmit an NFC tagging signal to the remote control device 200 (S1301).

The mobile terminal 500 may transmit an account list API (Application Programming Interface) call command to the display device 100 according to an NFC tagging response signal corresponding to the NFC tagging signal (S1303).

The external display device 1310 may transmit an account information request requesting accounts currently connected to the external display device 100 to the server 1330 in response to the call command (S1305).

The external display device 1310 may receive account information including accounts currently connected to the external display device 100 from the server 1330 (S1307), and transmits the account information to the mobile terminal 500 (S1309).

FIG. 14 is a diagram for describing account information received by an external display device from a server according to an embodiment of the present disclosure.

Referring to FIG. 14, account information 1400 may include information on each of a plurality of accounts connected to the external display device 1310.

The information of each account may include an ID (e.g., email) of the account and the number of the account.

The account information 1400 may further include an identifier (deviceId) of the external display device 1310 to which the plurality of accounts are connected.

Again, description will be given with reference to FIG. 13.

The mobile terminal 500 may transmit an account linking request requesting linking through a corresponding account to the external display device 1310 according to a command for selecting any one of the plurality of accounts included in the received account information (S1311).

The external display device 1310 may transfer the received account linking request to the server 1330 (S1313), receive a linking completion response indicating that account linking is completed from the server 1330 (S1315), and transfer the linking completion response to the mobile terminal 500 (S1317).

The mobile terminal 500 may transmit a request requesting confirmation from an IoT-operable device to the external display device 1310 through a home dashboard screen according to the linking completion response (S1319).

The home dashboard screen may be a screen for controlling IoT devices displayed according to the execution of the device management application.

The external display device 1310 may request a list of IoT devices connected to the account from the server 1330 as receiving a request to identify IoT-operable devices (S1321), receive the list of IoT devices connected to the account from the server 1330 (S1323) and transfer the list of IoT devices to the mobile terminal 500 to the mobile terminal 500 (S1325).

In an embodiment, the external display device 1310 may transmit the ID and user number of a selected account to the server 1330, and the server 1330 may extract the list of IoT devices using the received ID and user number of the account.

The mobile terminal 500 may display the list of IoT devices (S1327) and transmit an IoT device control request for controlling an operation of any one of a plurality of IoT devices included in the list of IoT devices to the external display device 1310 (S1329).

The external display device 1310 may transfer the IoT device control request to the server 1330 (S1331).

The server 1330 may transmit a control command to a corresponding IoT device according to the received IoT device control request (S1333).

As described above, according to an embodiment of the present disclosure, a user can easily control IoT devices linked to his or her account through the external display device 1310 only by an NFC tagging operation.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The above-described display device is not limited to the configuration and method of the above-described embodiments, but the embodiments may be configured by selectively combining all or part of each embodiment such that various modifications can be made.

What is claimed is:

1. A terminal comprising:
    a display;
    a Near Field Communication (NFC) circuit configured to perform NFC communication with a remote control device of a display device;
    a Bluetooth circuit; and
    a processor configured to:
    transmit, to the remote control device, an NFC tagging signal; and
    transmit, to the display device, a request for the display device to establish Bluetooth connection with a selected external device that is Bluetooth-connected to the terminal in response to the NFC tagging signal,
    wherein the transmitted request includes a Bluetooth address of the selected external device.

2. The terminal of claim 1, wherein the processor is further configured to:
    display on the display an external device list including one or more external devices Bluetooth-connected to the terminal, wherein the selected external device is selected from the one or more external devices on the external device list.

3. The terminal of claim 2, wherein each of the one or more external devices on the external device list is an Advanced Audio Distribution Profile (A2DP) device having a device class value that is not a value representing a TV or a computer.

4. The terminal of claim 2, wherein the selected external device is a device outputting audio received from the terminal.

5. The terminal of claim 2, further comprising:
a memory configured to store device history information including information on devices that have been previously connected to the display device through Bluetooth,
wherein the processor is further configured to:
receive, from the display device in response to the NFC tagging signal, connected device information on devices Bluetooth-connected to the display device; and
display the external device list based on a Bluetooth address of a device included in the connected device information not being included in the device history information.

6. The terminal of claim 5, wherein the processor is further configured to transmit a connection suspension request to the display device requesting to suspend the Bluetooth connection with a connected device based on the Bluetooth address of the connected device being included in the device history information.

7. The terminal of claim 6, wherein the processor is further configured to establish Bluetooth connection with the connected device after the Bluetooth connection between the display device and the connected device is suspended.

8. The terminal of claim 7, wherein the processor is further configured to establish Bluetooth connection with the connected device based on the processor detecting that a Bluetooth connection state of the display device is switched from a pairing state to a disconnected state based on a message received from the display device.

9. The terminal of claim 1, further comprising:
a memory,
wherein the processor is further configured to store an identifier of the display device and a Bluetooth address of the selected external device in the memory to be matched with each other.

10. The terminal of claim 1, wherein the processor is further configured to disconnect the Bluetooth connection with the selected external device after the request is transmitted to the display device.

11. The terminal of claim 1, wherein the processor is further configured to display, on the display, information on a Bluetooth connection of the external device in response to the tagging signal transmitted to the remote control device.

12. The terminal of claim 11, wherein the processor is further configured to:
obtain flag information on the Bluetooth connection of the external device,
display a first menu indicating that the external device is connected to the display device based on a value of the flag information being a first value, and
display a second menu indicating that the external device is connected to the terminal when the value of the flag information being a second value.

13. The terminal of claim 1, wherein the processor is configured to communicate with the display device through a websocket.

14. A method of establishing Bluetooth connections for a display device using a remote control device and a terminal, the method comprising:
transmitting, from the terminal to the remote control device, an NFC tagging signal; and
transmitting, to the display device, a request for the display device to establish Bluetooth connection with a selected external device Bluetooth-connected to the terminal in response to the NFC tagging signal,
wherein the transmitted request includes a Bluetooth address of the selected external device.

15. The method of claim 14, further comprising displaying, at the terminal, an external device list including one or more external devices Bluetooth-connected to the terminal, wherein the selected external device is selected from the one or more external devices on the external device list.

16. The method of claim 15, wherein the selected external device is a device outputting audio received from the terminal.

17. The method of claim 14, further comprising suspending Bluetooth connection between the terminal and the selected external device after the request is transmitted to the display device.

18. The method of claim 14, further comprising transmitting audio from the display device to the selected external device after establishing Bluetooth connection with the selected external device.

19. The method of claim 18, further comprising transmitting, from the terminal to the display device, a connection suspension request to suspend the Bluetooth connection with the selected external device according to NFC re-tagging with the remote control device.

* * * * *